United States Patent [19]

Bagley et al.

[11] Patent Number: 5,194,341
[45] Date of Patent: Mar. 16, 1993

[54] SILICA ELECTROLYTE ELEMENT FOR SECONDARY LITHIUM BATTERY

[75] Inventors: Brian G. Bagley, Warren; Jean-Marie Tarascon, Martinsville, both of N.J.

[73] Assignee: Bell Communications Research, Inc., Livingston, N.J.

[21] Appl. No.: 801,038

[22] Filed: Dec. 3, 1991

[51] Int. Cl.[5] .............................................. H01M 2/16
[52] U.S. Cl. .................................... 429/189; 429/194; 429/247
[58] Field of Search ............... 429/189, 190, 191, 247, 429/194

[56] References Cited

U.S. PATENT DOCUMENTS

| | | | |
|---|---|---|---|
| 3,379,570 | 4/1968 | Berger et al. | 429/247 X |
| 4,018,971 | 4/1977 | Sheibley et al. | 429/190 X |
| 4,122,041 | 10/1978 | Mahler | 429/247 X |
| 4,751,159 | 6/1988 | Tarascon | 429/194 |
| 4,828,834 | 5/1989 | Nagaura et al. | 429/194 |
| 4,937,156 | 6/1990 | Boeller et al. | 429/190 X |

OTHER PUBLICATIONS

"New Positive-electrode Materials for Lithium Thin Film Secondary Batteries*", G. Meunier et al., *Materials Science and Engineering* B3, 1989, 19-23.

"Dielectric and High Tc Superconductor Applications of Sol-Gel and Modified Sol-Gel Processing to Microelectronics Technology", B. G. Bagley et al., *Journal of Non-Crystalline Solids*, 121, 1990, 454-462.

"Electrochemistry of Manganese Dioxide in Lithium Nonaqueous Cell", Tsutomu Ohzuku et al., *J. Electrochem. Soc.*, 137, 1990, 40-46.

*Primary Examiner*—Stephen Kalafut
*Attorney, Agent, or Firm*—Leonard Charles Suchyta; Lionel N. White

[57] ABSTRACT

A film of linear organosilsesquioxane polymer, or "ladder" organosiloxane, coated upon the surface of a $LiMn_2O_4$ secondary battery electrode 19 and cured to a glassy layer is subjected to plasma oxidation to remove pendant organic groups comprising the coated polymer. The resulting ultrathin silica separator layer 17 is replete with minute pores which take up and retain by capillarity a typical $LiClO_4$ electrolyte solution. A counter-electrode 15 placed in intimate contact with the silica electrolyte element completes a secondary battery structure 10 in which lithium ions readily migrate through the electrolyte during repeated discharge/-charge cycles without loss of element integrity or efficacy.

10 Claims, 1 Drawing Sheet

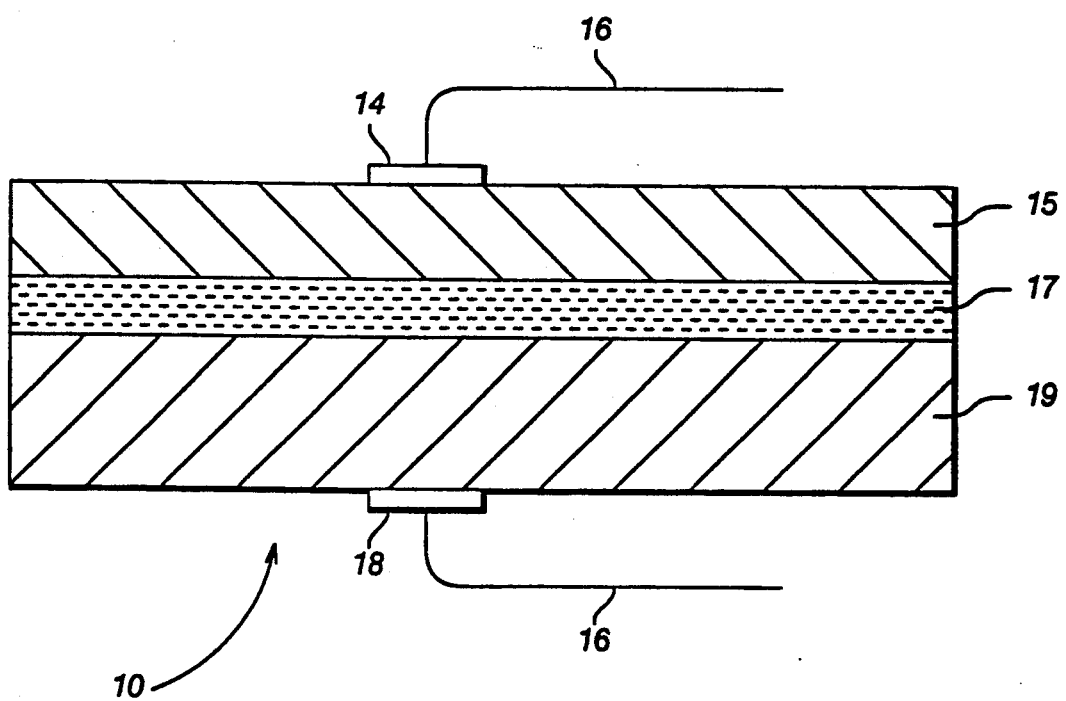

SILICA ELECTROLYTE ELEMENT FOR SECONDARY LITHIUM BATTERY

BACKGROUND OF THE INVENTION

The present invention relates to secondary (rechargeable) batteries which utilize electrodes comprising intercalation compounds, principally lithiated ternary transition metal oxides, such as $LiMn_2O_4$, $LiCoO_2$, and $LiNiO_2$. In particular, the invention yields an improved electrolyte element which serves to more effectively separate the battery electrodes while providing a highly functional and economical electrolytic medium for the intercalation process.

Early secondary lithium battery structures typically comprised an elemental lithium metal negative electrode physically separated from a positive electrode of intercalatable compound by an electrically insulating element which served a secondary role as a means of immobilizing a fluid electrolyte for the system. Although some success has been reported in the use of a unique solid electrolyte (Meunier et al., *Mat. Sci. and Eng.*, B3 (1989) 19-23), commercially feasible electrolyte elements have for the most part been sheets or films of porous materials, such as glass fiber filter paper or cloth (U.S. Pat. No. 4,751,159) and microporous polyethylene or polypropylene film or nonwoven cloth (Ohzuku et al., *J. Electrochem. Soc.*, Vol. 137, No. 1, 1990) saturated with solutions of lithium compounds, typically $LiClO_4$ or $LiBF_4$ in propylene carbonate, diethoxyethane, or other organic solvent (U.S. Pat. No. 4,828,834).

These separator/electrolyte elements were not wholly satisfactory, however, due to their relatively great thickness, which resulted in excessive separation between electrodes, and their large pore size, which allowed a dangerous level of lithium dendrite formation at the positive electrode upon recharging. Glass fiber cloth, for example, resulted in electrode separation of about 300 micrometers while providing restrictive channeling down to only about 250 nanometers. Some improvement was provided by costly microporous polyethylene membranes of about 50 micrometer thickness, but these elements were difficult to individually maneuver into battery structures and presented the additional disadvantage of low strength and excessive thermal sensitivity.

There has since been substantial improvement in battery components, such as by the substitution of lithium intercalated compounds for hazardously reactive lithium metal. The most practical electrolytes from the standpoint of functionality, reasonable cost, and ease of handling continue, however, to be the organic solutions containing lithium ion salts. The present invention, therefore, marks a notable improvement in the fabrication of secondary lithium batteries by providing a medium for immobilizing these fluid electrolytes in a separator element of minimal thickness and pore size, thereby increasing the efficiency of electrolytic activity across the reduced interelectrode span and allowing the use of all manner of electrode material, including elemental lithium.

SUMMARY OF THE INVENTION

The electrolyte element of the invention is a porous silicate glass film which is prepared in situ from a thin layer of an organosilicon polymer solution typically coated on the surface of one of the secondary battery electrodes. After drying to remove the solvent vehicle, the coating is cured to a glassy film and then subjected to plasma oxidation which removes pendant organic groups from the polymer film.

The resulting silicate film is replete with microscopic pores formed by the organic group removal and readily takes up and immobily retains by capillarity any of a number of commonly employed electrolyte solutions. The invention thus provides a unique combination of the desired high mobility of liquid electrolyte cations and the robustness and permanence of a continuous, non-fluid fenestrated silica network. The counter electrode of the battery is then firmly positioned in contact with the electrolyte element separator to complete, with appropriate electrical conductors, the functional assembly of a secondary battery.

Organosilicon polymers useful in the present invention are the organosilsesquioxane condensation compounds, the so-called "ladder" polymers, described for coating applications by Bagley et al. in *Journal of Non-Crystalline Solids*, 121 (1990) 457-459 and in U.S. Pat. Nos. 4,835,057 and 4,885,186. These compounds have a silicate backbone and may comprise a number of various organic, e.g., methyl and phenyl, pendant groups. It is apparently the removal of these groups during the plasma oxidation operation that yields the minute voids and capillary channels which subsequently fill with electrolyte solution and provide the lithium ion path between electrodes. Less dense structures can be prepared using linear siloxanes with a single silicon-oxygen backbone, and combinations of ladder and linear siloxanes can be used to control further pore volume. Void volume fraction in the electrolyte element may also be increased by incorporating into the coating composition an organic component, e.g, a polymer, which will be eliminated upon oxidation. Care should be exercised, however, to avoid overly large pore volumes with their increased potential for lithium dendrite penetration.

The coating operation employed in forming the electrolyte element is particularly useful not only for providing a simple and economical method of fabrication, but also in enabling the precise and secure positioning of this component in the battery structure. The precursor polymer solution may be varied in polymer content and viscosity and the coating procedure may be any common type, thus providing a broad range of finished separator thicknesses down to a few micrometers. The selection of coating substrate is also a simple matter of preference, whether it be desired to locate an ultrathin separator adherent to the surface of an electrode, for example, or to form a self-sustaining electrolyte element layer on a temporary support for later insertion into a composite battery assembly.

THE DRAWING

The present invention will be described with reference to the accompanying drawing which depicts in elevational cross-section typical components of a secondary battery incorporating an electrolyte element of the invention.

DESCRIPTION OF THE INVENTION

An organosilsesquioxane polymer precursor for the electrolyte element of the invention has the general formula:

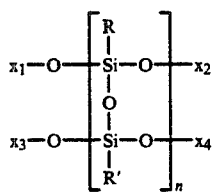

wherein R and R' are the same or different radicals selected from the group consisting of aliphatics of 1-4 carbons, phenyl, phenyls substituted with one or more hydroxy or halogen, and halogens, provided R and R' are not both halogen; $x_1$, $x_2$, $x_3$, and $x_4$ are functional radicals selected from the group consisting of alkoxies of 1-4 carbons, halogens, hydroxyl, and silanol; and n is an integer in the range of 10-200. These "ladder" siloxane polymers are commercially prepared by hydrolysis and condensation polymerization of the appropriately substituted silanes.

Preparation of the electrolyte element begins with the formation of a solution of the selected ladder polymer in an organic solvent. This solution, adjusted as desired for viscosity and solids composition, is then cast as a coating by any common method, such as spinning, dipping, or the like, onto a selected substrate and dried. Moderate heating in the range of about 150°-400° C., depending upon the extent of time, cures the coating to a glass-like state that is insoluble in organic solvents. The ready formation of precursor polymer layers in this manner provides a particular advantage in allowing the precise positioning of electrolyte elements of minimal and consistent thickness in the final battery structure. Coating upon a battery electrode component, for example, locates the electrolyte element in its desired position throughout battery assembly, thereby simplifying that operation and ensuring proper and secure element arrangement.

The cured precursor polymer layer is then processed to remove the pendant radical groups and impart to the remaining silica layer an intricate network of minute voids, the sizes of which generally vary, down to about 10 nm, with the sizes of the respective radicals. This processing may comprise heating in air or oxygen in the range of 600°-1000° C., but the deleterious effects of such temperatures are avoided and the processing made far more practical by the preferred barrel reactor plasma oxidation at room temperature. The fenestrated silica layer is then prepared for incorporation into a battery assembly by filling the voids network with the desired electrolyte solution, typically a lithium compound, such as $LiClO_4$, $LiAsF_6$, $LiPF_6$, $LiBF_4$, or $LiB(C_6H_5)_4$, in a suitable organic solvent. Loading the electrolyte is simply a matter of application to the element surface where the solution is taken in by the natural capillarity of the dispersed voids network. Completely filling the smallest voids may be facilitated by prior evacuation of the voids or application of the solution under pressure. Once loaded into the voids matrix network, the electrolyte is substantially immobilized with little danger of leakage or migration within the finished battery assembly.

A secondary battery 10 incorporating an electrolyte element of the invention is depicted in the drawing Figure. This representative structure comprises positive electrode 19 which may be one of the many available intercalatable materials, for example $TiS_2$, $TiS_xO_y$, or $AgMo_6S_8$, which have been employed with lithium electrodes, or, preferably, one of the more functional lithiated ternary transition metal oxides, such as $LiMn_2O_4$, $Li_2Mn_2O_4$, $LiCoO_2$, or $LiNiO_2$. In intimate contact with electrode 19, preferably as an attached coated layer previously described, is separator/electrolyte element 17, the voids matrix of which contains the lithium ion electrolyte solution. Negative electrode 15 pressed into firm contact with electrolyte element 17 by means of a swagelock or other compressive assembly device completes the basic battery assembly and may be any of the many known lithium ion sources, for example lithium metal, a lithium alloy, or, preferably, a lithium intercalatable material such as $WO_2$, Al, or carbon, which have been shown to be effective with the noted lithiated ternary oxide electrodes. Collector plates 14, 18 intimately contacting respective electrodes 15, 19 provide means for attaching electrical conductors 16 through which current flows during the charge and discharge cycles of the battery.

EXAMPLE

A preferred secondary battery embodying the present electrolyte element was constructed in the following manner. $LiMn_2O_4$ powder, typically prepared by thermal reaction of lithium carbonate and manganese dioxide, was mixed with about one weight percent polytetrafluoroethylene binder and five percent Super -S graphite for improved electrical conductivity. The resulting mixture was compressed to form an electrode wafer 19 about 0.8 mm thick. One face of the wafer was flow coated with an acetylnitrile solution of about 40 weight percent solid GR150, a ladder siloxane commercially obtained from OI-NEG and having methyl and phenyl pendant radicals. The pot-life of this coating solution was somewhat limited by its slow conversion to a viscous gel, a condition that appears to be accelerated by its hygroscopicity. The coating was thoroughly oven-dried at about 110° C. and then heated for an additional 30 minutes at about 220° C. to complete the curing of the coating to a glassy layer about 50 micrometers thick.

The uncoated side of the electrode wafer was temporarily covered with a thin foil of aluminum to protect against oxidation of the $LiMn_2O_4$ surface which could otherwise result in loss of contact conductivity. The assembly was placed in a barrel plasma oxidation reactor with the siloxane surface in position for exposure to the plasma. The siloxane layer was then oxidized at 13.56 MHz in pure oxygen at a pressure of about one millitor for about three hours during which time the methyl and phenyl radicals were removed from the silica backbone of the compound. This initially clear layer became opaquely white due to light scattering by the dispersed voids matrix formed as a result of removing the pendant radicals.

A one molar electrolyte solution of $LiClO_4$ in a mixture of equal parts of diethylene carbonate and diethoxyethane was applied at ambient conditions to the silica layer surface and after a few minutes the surface was blotted dry of excess solution. A decrease in the whiteness of the silica layer evidenced the infusion of electrolyte into the voids matrix. A wafer 15 of graphite about 0.7 mm thick was then positioned on the silica layer separator/electrolyte element 17 to serve as the negative electrode of the battery assembly. Stainless steel contact plates 14, 18 were placed in intimate contact with the exposed surfaces of electrodes 15, 19 and the assembly was compressed in a swagelock test cell to form battery 10.

The battery was then charged through conductors 16 during which operation lithium ions migrated through electrolyte element 17 from LiMn$_2$O$_4$ electrode 19 to intercalate graphite electrode 15 which thereafter served as the negative electrode lithium ion source upon discharge of the battery. Charging was discontinued at a predetermined limit of about 4.5 V to prevent decomposition of the electrolyte solvent. The battery was then continually operated through discharge/charge cycles for several weeks. At the conclusion of this test period, the battery was disassembled in order to examine electrolyte element 17 which appeared to be intact with no discernible loss or leakage of electrolyte solution.

The utility of the present electrolyte elements in secondary lithium batteries with all manner of electrode combinations, whether including lithium metal or alloys, or the more environmentally preferred intercalation electrodes, provides the means for safer and more economical supplies of these important energy sources. In addition to the suggested variations in electrode combinations and electrolyte element composition and processing, it is anticipated that other embodiments of the present invention will undoubtedly occur to the skilled artisan in the light of the foregoing description. Such embodiments are likewise intended to be encompassed within the scope of the invention as recited in the following claims.

What is claimed is:

1. An electrolyte element for a secondary battery, which element comprises:
   a) a continuous silica layer having dispersed therein a multiplicity of minute voids; and
   b) a fluid organic solution electrolyte contained within said voids.

2. An electrolyte element according to claim 1 wherein said silica layer is the oxidation product of a cured film of siloxane polymer having the general formula:

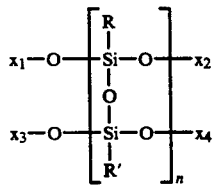

wherein R and R' are the same or different radicals selected from the group consisting of aliphatics of 1-4 carbons, phenyl, phenyls substituted with one or more hydroxy or halogen, and halogens, provided R and R' are not both halogen; $x_1$, $x_2$, $x_3$, and $x_4$ are functional radicals selected from the group consisting of alkoxies of 1-4 carbons, halogens, hydroxyl, and silanol; and n is an integer in the range of 10-200.

3. An electrolyte element according to claim 1 wherein said fluid electrolyte is an organic solution comprising a lithium compound.

4. An electrolyte element according to claim 3 wherein said lithium compound is selected from the group consisting of LiClO$_4$, LiAsF$_6$, LiPF$_6$, LiBF$_4$, and LiB(C$_6$H$_5$)$_4$.

5. A method of making an electrolyte element for a secondary battery which comprises:
   a) coating onto a substrate a solution of a siloxane polymer having the general formula:

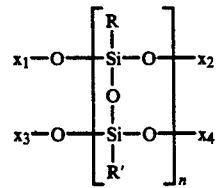

wherein R and R' are the same or different radicals selected from the group consisting of aliphatics of 1-4 carbons, phenyl, phenyls substituted with one or more hydroxy or halogen, and halogens, provided R and R' are not both halogen; $x_1$, $x_2$, $x_3$, and $x_4$ are functional radicals selected from the group consisting of alkoxies of 1-4 carbons, halogens, hydroxyl, and silanol; and n is an integer in the range of 10-200;
   b) drying the resulting coating to form a layer of said siloxane polymer;
   c) curing said polymer layer to a solid glassy state;
   d) treating the cured polymer layer to remove said pendant radicals and thereby convert said polymer layer to a layer of silica having a network of minute voids throughout; and
   e) contacting the surface of said silica layer with a fluid electrolyte to thereby cause the infusion of said electrolyte into said voids network.

6. A method according to claim 5 wherein said substrate is an electrode element for a secondary battery.

7. A method according to claim 5 wherein said cured polymer layer is treated by means of plasma oxidation.

8. A method according to claim 5 wherein said fluid electrolyte is an organic solution comprising a lithium compound.

9. A secondary battery comprising a positive electrode and a negative electrode, one of said electrodes providing a source of lithium ions, and an electrolyte element separating said electrodes and providing a medium for migration of said lithium ions between said electrodes characterized in that said electrolyte element comprises:
   a) a silica layer having dispersed therein a network of minute voids; and
   b) a fluid electrolyte contained within said voids network.

10. A secondary battery according to claim 9 characterized in that said silica layer is the oxidation product of a cured film of siloxane polymer having the general formula:

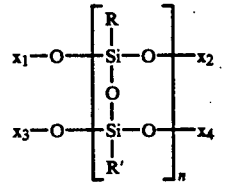

wherein R and R' are the same or different radicals selected from the group consisting of aliphatics of 1-4 carbons, phenyl, phenyls substituted with one or more hydroxy or halogen, and halogens, provided R and R' are not both halogen; $x_1$, $x_2$, $x_3$, and $x_4$ are functional radicals selected from the group consisting of alkoxies of 1-4 carbons, halogens, hydroxyl, and silanol; and n is an integer in the range of 10-200.

* * * * *